United States Patent
Lendi

(10) Patent No.: US 12,397,310 B2
(45) Date of Patent: Aug. 26, 2025

(54) EXTENSION SLEEVE FOR A CAMERA ADAPTER AND NOZZLE HAVING THE EXTENSION SLEEVE

(71) Applicant: Enz Technik AG, Giswil (CH)

(72) Inventor: Christoph Lendi, Giswil (CH)

(73) Assignee: Enz Technik AG, Giswil (CH)

( * ) Notice: Subject to any disclaimer, the term of this patent is extended or adjusted under 35 U.S.C. 154(b) by 564 days.

(21) Appl. No.: 17/732,863

(22) Filed: Apr. 29, 2022

(65) Prior Publication Data
US 2022/0347707 A1 Nov. 3, 2022

(30) Foreign Application Priority Data
Apr. 29, 2021 (CH) .................................. 00466/21

(51) Int. Cl.
| | |
|---|---|
| B05B 13/06 | (2006.01) |
| B08B 9/04 | (2006.01) |
| F16L 101/12 | (2006.01) |
| H04N 23/50 | (2023.01) |
| H04N 23/661 | (2023.01) |

(52) U.S. Cl.
CPC ............ B05B 13/0627 (2013.01); B08B 9/04 (2013.01); H04N 23/661 (2023.01); *F16L 2101/12* (2013.01); *H04N 23/555* (2023.01)

(58) Field of Classification Search
CPC ............................. B08B 9/04; B05B 13/0627
See application file for complete search history.

(56) References Cited

U.S. PATENT DOCUMENTS

| | | | | |
|---|---|---|---|---|
| 2,646,822 | A * | 7/1953 | Ferguson | F16L 58/182 285/294.1 |
| 2017/0271860 | A1* | 9/2017 | Mashio | H01B 7/2806 |
| 2020/0012182 | A1* | 1/2020 | Warren | G01N 21/954 |

FOREIGN PATENT DOCUMENTS

| | | | | |
|---|---|---|---|---|
| CN | 108723024 A | * | 11/2018 | |
| DE | 102017125733 A1 | * | 5/2019 | ........... B05B 1/1636 |
| EP | 3513877 B1 | * | 9/2020 | ............. B05B 1/042 |

OTHER PUBLICATIONS

EP3513877A1 Machine Translation (Year: 2019).*
DE102017125733A1 Machine Translation (Year: 2019).*
CN108723024A Machine Translation (Year: 2018).*

* cited by examiner

*Primary Examiner* — Spencer E. Bell
(74) *Attorney, Agent, or Firm* — Fleit Intellectual Property Law; Paul D. Bianco; Katharine Davis Wong

(57) ABSTRACT

Electrical interference signals are to be eliminated during operation and video quality improved in a metal extension sleeve incorporated in an internal space of a nozzle element of a pipe cleaning nozzle and/or inspection nozzle for contacting an electrical conductor via a camera adapter through the internal space of the nozzle element with a camera module fastened outside the nozzle element. The extension sleeve spans the length of the nozzle element and is releasably fastened form-fit and/or force-fit on the camera adapter and the at least one extension sleeve has coupling threads along the outer surface of the coupling section, with which the extension sleeve is tightened in the internal space of the nozzle element. The metal extension sleeve has an electrical insulation layer made of plastic on its outer surface spaced from the central longitudinal axis, which is applied fully to the entire outer surface without defects.

17 Claims, 1 Drawing Sheet

EXTENSION SLEEVE FOR A CAMERA ADAPTER AND NOZZLE HAVING THE EXTENSION SLEEVE

TECHNICAL FIELD

The present invention describes a metal extension sleeve incorporated in an internal space of a nozzle element of a pipe cleaning nozzle and/or inspection nozzle for contacting an electrical conductor via a camera adapter through the internal space of the nozzle element with a camera module fastened outside the nozzle element, the extension sleeve spanning the length of the nozzle element and being releasably fastened in a form-fit and/or force-fit manner to the camera adapter, and the at least one extension sleeve having coupling threads along the outside surface of the coupling section, with which the extension sleeve is tightened in the internal space of the nozzle element, and a pipe cleaning nozzle and/or inspection nozzle, comprising a metal nozzle element with at least one feed nozzle and at least one cleaning nozzle, in which a camera module is connected by means of a camera adapter partially inserted into an internal space in the nozzle element to an electrical voltage and/or an electrical conductor carrying data signals is connected in the connection area of a high-pressure tube to the cleaning nozzle and/or inspection nozzle.

BACKGROUND

Pure pipe cleaning nozzles and pipe cleaning nozzles with additional camera modules, which are also called inspection nozzles, are known in the technical field of pipe cleaning. In addition to the further development of the camera module, an objective was also to devise capabilities so that an existing camera module can be coupled simply and cost effectively to a number of pipe cleaning and/or inspection nozzles and secure, reliable coupling of the electrical lines is also always achieved. Electrical voltage, as well as the data signals of video transmission had to be reliably achieved in permanent fashion in shafts and pipes during introduction of cleaning fluids with high pressures.

Accordingly, the applicant in its own application therefore dealt with fastening different camera modules by means of a camera adapter and an extension sleeve in a crossing channel through a stator part, a rotor part and a thrust part of a nozzle element, so that a high-pressure tube can be coupled with a tube wall and electrical conductor in the high-pressure tube. An adapter element of the camera adapter with an internal power/signal line, an isolation element and a loop contact, similar to a whisk, was then adjusted to the metal extension sleeve. The extension sleeve comes to lie in the central channel of the nozzle element, so that cleaning fluid can exit through at least one cleaning nozzle emerging laterally from the nozzle element. A good cleaning effect could therefore be achieved and a camera image transmitted by the camera module to the outside via the high-pressure tube.

However, it has been found in practice that the video signal is subject to disturbances and that over-voltages or short circuits can occur. In this case, cleaning fluid must have entered the camera module or interfered with the electrical wiring in some other way.

SUMMARY OF THE INVENTION

One aspect of the present invention relates to improving the extension sleeve, and therefore the pipe cleaning nozzle and/or inspection nozzle, so that the electrical interference signals are eliminated and the video quality is improved.

Variations of the feature combinations and slight adjustments of the invention to realize this aspect can be found in this specification, are shown in the figures and included in the at least some of the claims.

BRIEF DESCRIPTION OF THE DRAWINGS

A preferred embodiment example of the object of the invention is described below in conjunction with the appended drawings.

Additional features, details and advantages of the invention are apparent from the following description of the preferred embodiment of the invention as well as the drawings:

In the drawings:

FIG. 1 shows a partially cut-away schematic side view of a multi-part pipe cleaning and/or inspection nozzle in the form of a rotating nozzle with a camera module, in which an extension sleeve is arranged concentrically to the interior space of the rotating nozzle next to the camera adapter.

FIG. 2 shows a schematic partially cut-away side view of the camera adapter according to FIG. 1, whereas FIG. 3 shows a schematic side view of an extension nozzle with the isolation layer indicated.

DESCRIPTION

Figure 1:
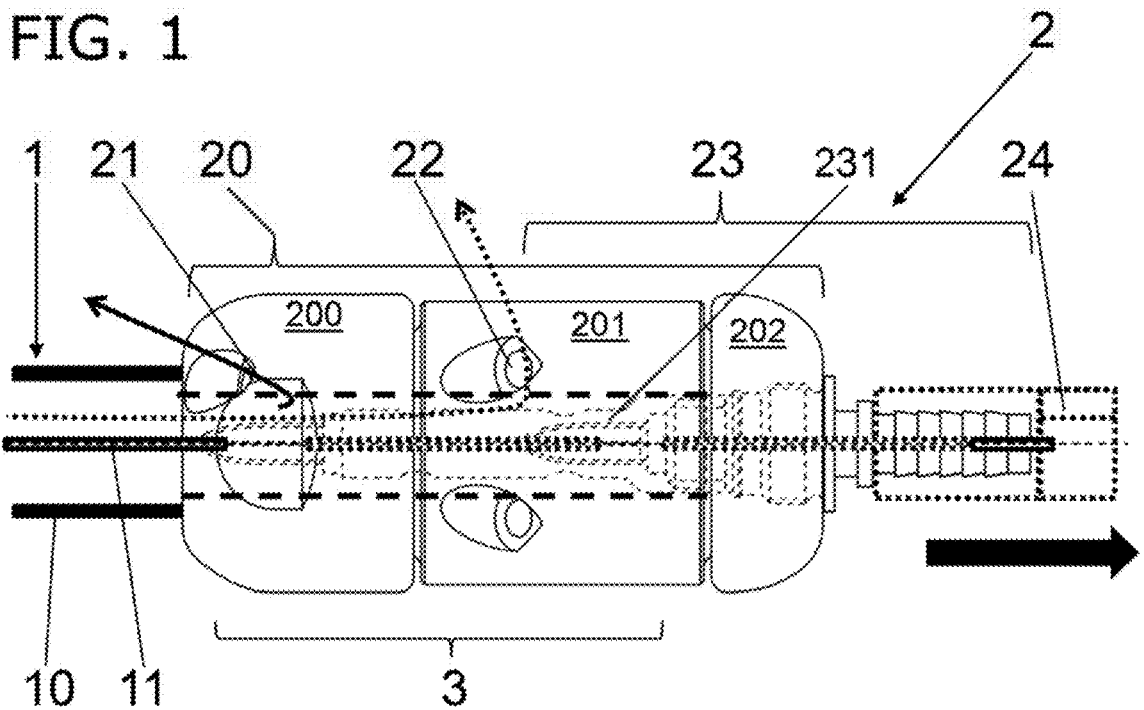
Figure 2:
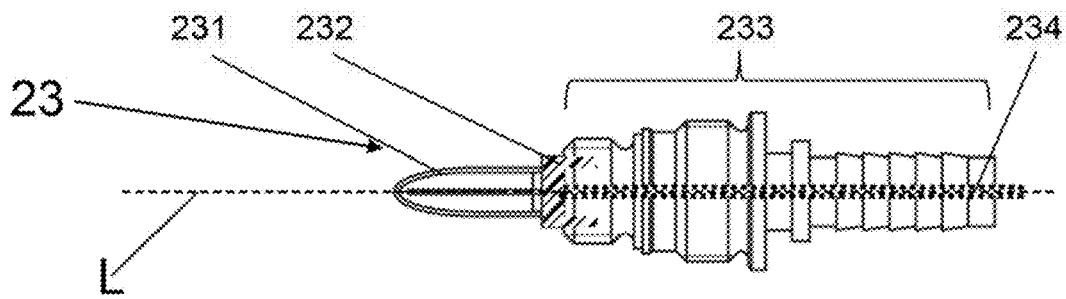

The pipe cleaning nozzles and/or inspection nozzles 2 of interest here have at least one nozzle element 20, to which a high-pressure tube 1 can be connected. The pipe cleaning nozzle and/or inspection nozzle 2 can be moved parallel to the longitudinal axis L in the feed direction through at least one feed nozzle 21, as indicated by the black arrow. A camera adapter 23, to which a camera module 24 can be directly or indirectly fastened, is arranged in an internal space exposed to a pressure medium. The camera module 24 is supplied with power, and data signals are conducted away from the camera module 24 from the pipe cleaning nozzle and/or inspection nozzle 2 from a tube wall 10 with electrical contact and/or electrical conductors 11 through the high-pressure tube 1. The camera adapter 23 and its length are adjusted to the length of the torpedo nozzle 2. The nozzle element 20 includes a thrust part 200, a rotor part 201 and a stator part 202, which is also called head 202. The at least one feed nozzle 21 and at least one cleaning nozzle 22 are arranged within the nozzle element 20. The internal space of the nozzle element 20 and the pipe cleaning nozzles and/or inspection nozzle 2 is a central channel through which cleaning fluid is pumped.

In order to ensure wiring free of short circuits, the camera adapter 23 has a loop contact 231 on its end on the high-pressure tube, which is shaped here roughly like a whisk. Different camera adapters 23 of different length produced in costly fashion need not be used for nozzles 2 or nozzle elements 20 of different length, but an extension sleeve 3 is available in different lengths and can be changed. The extension sleeve 3 is incorporated in the internal space of the pipe cleaning nozzle and/or inspection nozzle 2 and fastened indirectly in it. A force-fit and/or form-fit connection of the extension sleeve 3 with the camera adapter 23 is provided in nozzle element 20. The camera adapter 23 is also fastened in the internal space of the nozzle element 20 in a force-fit and/or form-fit manner, so that the connections can be released when needed.

In addition, when pressure medium flows through the internal space of nozzle 2 in which the extension sleeve 3 is situated and emerges through a cleaning nozzle 22, as indicated in FIG. 1 by the dashed line, the camera module 24 can be supplied with power and/or the data signals taken off.

In the incorporated state the electrically conducting extension sleeve 3 is electrically conductively connected to the camera adapter 23 and the stator part 202 and therefore nozzle element 20. The coupling threads 320 can be omitted in a clamp connection between coupling section 32 and camera adapter 23. The cable, i.e., the internal power/signal line, is in electrically conductive contact with the internal power/signal line of the camera adapter 23 and the internal power/signal line and the internal power/signal line of the camera adapter 23 are arranged electrically insulated relative to nozzle element 20, camera adapter 23 and extension sleeve 3.

The loop contact 231 is fastened to a metal adapter element 233 by means of an isolation element 232. An internal power/signal line 234 is connected on the insulator element 232 to the loop contact 231 and extending through an internal space of adapter element 233 in a camera module direction. Electrical power and/or data signals can thus be sent from the loop contact 231 to the camera module 24. The length of camera adapter 23 in the direction of the longitudinal axis L is adjusted to a torpedo nozzle 2 and the corresponding nozzle element 20.

The adapter element 233 is made from metal and has, in this order in the direction of longitudinal axis L, first external threads, a stop, second external threads, a flange and a sleeve. The camera adapter 23 is fastened in the internal space of nozzle element 20 or in the internal space of stator part 202 with the second external threads. The camera module 24 is screwed onto or mounted on the later protruding sleeve and the camera module 24 brought in contact with the internal power/signal line 234. In order for no short circuits to occur during attachment to nozzle element 20, there must be electrical isolation between the loop contact 231 and the internal power/signal line 234. The stop can be omitted, in which case the thread diameter of the first external threads and second external threads must be different. The diameter in the region of the first external threads must be smaller than the diameter of the second external threads. The flange serves to ensure that the camera adapter 23 cannot be lowered too far into the internal space of nozzle element 20. A screw connection between camera adapter 23 and nozzle element 20 is advantageous, but a plug connection would also be possible.

If a pipe cleaning nozzle and/or inspection nozzle 2 with deviating length of nozzle element 20 is used, the camera adapter 23 can no longer furnish the desired wiring between high-pressure tube 1 and camera module 24. The camera adapter 23 and its loop contact 231 can no longer be brought into direct contact with the electrical contact 11 in the high-pressure tube 1.

A modular structure with camera adapter 23 and extension sleeve 3 is then introduced. Through the extension sleeve 3, which is fastened by means of a screw connection to the camera adapter 23, an electrical conductor 11 oriented toward nozzle 2 on the side of the high-pressure tube can be brought into indirect contact with a camera module 24 via the extension sleeve 3 and the camera adapter 23.

The extension sleeve 3 has a high-pressure line section 30, an outlet section 31, and a coupling section 32, in that order.

The high-pressure line section 30 includes a sleeve loop contact 300, which can also be designed as a sleeve whisk, and a sleeve insulator element 301. The sleeve loop contact 300 includes one or more bent wire loops, which are electrically conductive. The sleeve insulator element 301 is inserted into the extension sleeve 3 and ensures electrical isolation of the sleeve loop contact 300 and at least one central internal power/signal line relative to extension sleeve 3.

The central internal power/signal line sends electrical voltage and/or data signals to the loop contact 231 of the camera adapter 23 in the installed state.

Several outlet openings 310 are provided in the extension sleeve 3 along the outlet section 31, through which pressure medium can be released from the external space radially outward from nozzle 2. Since the extension sleeve 3 is arranged in the internal space, a central channel in the nozzle 2 that carries the pressure medium, the pressure medium is thus guided through the interior of the extension sleeve 3. Holes running perpendicular to longitudinal axis L and fully crossing the outlet section 31 with resulting outlet openings 310 are preferably provided here. Two through-holes at three and nine o'clock, resulting in outlet openings 310, and a through-hole at twelve and six o'clock, resulting in outlets 310', are particularly preferred in the viewing direction of longitudinal axis L through extension sleeve 3. The outlet openings 310, 310' are thus arranged in opposite pairs but offset to each other by 90°.

The diameter of the high-pressure line section 30 and the outlet section 31 is smaller here than the diameter of the coupling section 32. The extension sleeve 3 is partially pushed over the camera adapter 23 and preferably fastened with screws. Mounting and clamping the extension sleeve 3 with its coupling section 32 onto the camera adapter 23 on its side facing the high-pressure tube are also possible.

The coupling section 32 preferably has coupling threads 320 with which the coupling section 32, and therefore the extension sleeve 3, are screwed onto the camera adapter 23.

The extension sleeve 3 is configured in the area of the high-pressure line section 30 with a smaller cross section than in the other areas of extension sleeve 3 and is therefore tapered. In a modification, external threads (not shown) are provided on the outer surface of the high-pressure line 30. Through tapering and the external threads, an additional extension sleeve 3 can be screwed onto the first extension sleeve 3. An arbitrarily longer internal space of a nozzle 2 can therefore be spanned by several extension sleeves 3, in which case a power supply and/or data connection is possible from the high-pressure tube side to the camera module 24.

Figure 3:
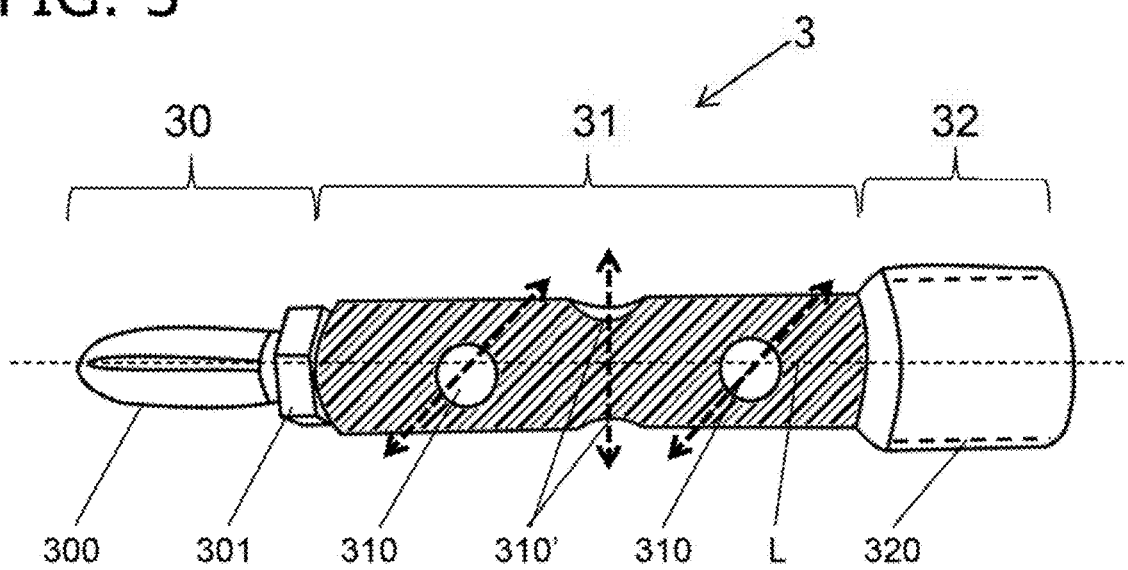

The extension sleeve 3 is made from metal, preferably steel, aluminum or brass. The envelope surface of the extension sleeve 3, i.e., the outer surface, which is spaced from the central longitudinal axis L, has an electrically isolating insulation layer. This electrically isolating insulation layer is shown with a dashed line in FIG. 3 as a plastic layer. The electrically isolating insulation layer is intended to be applied fully to the entire outer surface without defects.

The electrical isolation layer is preferably produced by a dipping process or application of liquid plastic with a brush. After curing or hardening, a roughly uniformly thick plastic layer remains along the outer surface of the extension sleeve 3. The minimal thickness of the electrical isolation layer lies at 0.5 mm. Experiments have shown that the signal quality could be improved by a sufficiently thick electrical isolation layer and voltage fluctuations and electrical crosstalk could be eliminated.

The sleeve insulator element 301 is also designed sleeve-like, with smaller cross section in the high-pressure line section 30 of the extension sleeve 3. The electrically insulating material of the sleeve insulator element 301 can be ceramic or plastic. The sleeve loop contact 300 is fastened in the sleeve insulator element 301 and connected, for example, by soldering with the internal power/signal line 311. Electrical connection of the sleeve loop contact 300 and the internal power/signal line 311 with the body of the extension sleeve 3 is therefore ruled out.

LIST OF REFERENCE NUMBERS

1 High-pressure tube
  10 Tube wall with electrical contact
  11 Electrical conductor through high-pressure tube/in tube wall
2 Pipe cleaning nozzle and/or inspection nozzle
  20 Nozzle elements
    200 Thrust part
    201 Rotor part
    202 Stator part/head
  21 Feed nozzle (at least one)
  22 Cleaning nozzle (at least one)
  23 Camera adapter
    231 Loop contact/whisk
    232 Insulator element/loop holder
    233 Adapter body
    234 Internal power/signal line
  24 Camera module
3 Extension sleeve (for camera adapter)
  30 High-pressure line section
    300 Sleeve loop contact/sleeve whisk
    301 Sleeve insulator element
  31 Outlet section (central)
    310 Outlet opening
    311 Internal power/signal line
  32 Coupling section
    320 Coupling threads
L Longitudinal axis

The invention claimed is:

1. A metal extension sleeve configured for incorporation into an internal space of a nozzle element and for contacting an electrical conductor via a camera adapter through the internal space of the nozzle element,
wherein the metal extension sleeve spans a length of the nozzle element and is releasably fastened in at least one of a form-fit and force-fit connection on the camera adapter,
wherein the metal extension sleeve has an outer surface spaced from a central longitudinal axis, and the outer surface includes coupling threads in a coupling section of the metal extension sleeve, the coupling threads configured for tightening the metal extension sleeve in the internal space of the nozzle element, and
wherein the metal extension sleeve has an electrical isolation layer composed of plastic on the outer surface, the electrical isolation layer covering all of the outer surface of the metal extension sleeve, including the coupling threads.

2. The metal extension sleeve according to claim 1, wherein the electrical isolation layer is formed on the outer surface of the metal extension sleeve by dipping the metal extension sleeve into liquid plastic.

3. The metal extension sleeve according to claim 1, wherein the electrical isolation layer is formed on the outer surface of the metal extension sleeve by brushing liquid plastic onto the outer surface.

4. The metal extension sleeve according to claim 1, wherein thickness of the electrical isolation layer on the outer surface of the metal extension sleeve is at least 0.5 mm throughout.

5. The metal extension sleeve according to claim 1, wherein holes running perpendicular to the central longitudinal axis of the metal extension sleeve and fully crossing an outlet section of the metal extension sleeve with corresponding resulting outlet openings are formed in the outlet section.

6. The metal extension sleeve according to claim 5, wherein at least two pairs of holes with corresponding resulting outlet openings fully crossing the outlet section and offset by 90° are arranged.

7. The metal extension sleeve according to claim 5, wherein two through-holes at three and nine o'clock, resulting in outlet openings, and a through-hole at twelve and six o'clock, resulting in outlet openings, are arranged in a viewing direction of a longitudinal direction through the metal extension sleeve in the outlet section.

8. A nozzle comprising the metal extension sleeve according to claim 1.

9. A nozzle configured for functioning as at least one of a pipe cleaning nozzle and an inspection nozzle, the nozzle comprising:
a metal nozzle element having at least one feed nozzle and at least one cleaning nozzle;
a camera adapter at least partially inserted into an internal space of the metal nozzle element;
a camera module connected via the camera adapter to an electrical conductor carrying at least one of an electrical voltage and a data signal, the electrical conductor arranged in a connection area of a high-pressure tube to the nozzle; and
a metal extension sleeve incorporated into the internal space of the metal nozzle element, the metal extension sleeve configured for providing interference-free signal transmission from the camera module to the electrical conductor;
wherein the metal extension sleeve spans a length of the metal nozzle element, crosses at least one thrust part and a rotor part in a channel, and is releasably fastened in at least one of a form-fit and force-fit connection on the camera adapter;
wherein the metal extension sleeve has an outer surface spaced from a central longitudinal axis, with the outer surface including coupling threads in a coupling section of the metal extension sleeve, the coupling threads configured for tightening the metal extension sleeve in the internal space of the metal nozzle element; and
wherein the metal extension sleeve has an electrical isolation layer composed of plastic on the outer surface, the electrical isolation layer covering all of the outer surface of the metal extension sleeve, including the coupling threads.

10. A metal extension sleeve configured for incorporation into an internal space of a nozzle element and for contacting an electrical conductor via a camera adapter through the internal space of the nozzle element, the metal extension sleeve having an outer surface spaced from a central longitudinal axis and comprising:
a high-pressure line section arranged at a first end of the metal extension sleeve, the high-pressure line section including a sleeve insulator element;
a coupling section arranged at a second end of the metal extension sleeve opposite the first end, the coupling section having coupling threads along an outer surface thereof, the coupling threads configured for tightening the metal extension sleeve in the internal space of the nozzle element; and an outlet section between the high-pressure line section and the coupling section, an outer surface of the outlet section having a plurality of outlet openings configured for releasing a pressure medium radially outward from an external space, wherein a sleeve loop contact is releasably fastened within the sleeve insulator element, the sleeve loop contact having at least one bent wire loop configured for electrical conduction;

wherein an outer surface of the high-pressure line section, the outer surface of the outlet section, and the outer surface of the coupling section include an electrical isolation layer composed of plastic, the electrical isolation layer covering all outer portions of the outer surface of the high-pressure line section, the outer surface of the outlet section, and the outer surface of the coupling section, including the coupling threads;

wherein the metal extension sleeve spans a length of the nozzle element and is releasably fastened in at least one of a form-fit and force-fit connection on the camera adapter.

11. The metal extension sleeve according to claim 10, wherein holes running perpendicular to the central longitudinal axis of the metal extension sleeve and fully crossing the outlet section of the metal extension sleeve with corresponding resulting outlet openings are formed in the outlet section.

12. The metal extension sleeve according to claim 11, wherein at least two pairs of holes with corresponding resulting outlet openings fully crossing the outlet section and offset by 90° are arranged.

13. The metal extension sleeve according to claim 11, wherein two through-holes at three and nine o'clock, resulting in outlet openings, and a through-hole at twelve and six o'clock, resulting in outlet openings, are arranged in a viewing direction of a longitudinal direction through the metal extension sleeve in the outlet section.

14. The metal extension sleeve according to claim 10, wherein the electrical isolation layer is formed on the outer surface of the metal extension sleeve by dipping the metal extension sleeve into liquid plastic.

15. The metal extension sleeve according to claim 10, wherein the electrical isolation layer is formed on the outer surface of the metal extension sleeve by brushing liquid plastic onto the outer surface.

16. The metal extension sleeve according to claim 10, wherein thickness of the electrical isolation layer on the outer surface of the metal extension sleeve is at least 0.5 mm throughout.

17. A nozzle configured for functioning as at least one of a pipe cleaning nozzle and an inspection nozzle, the nozzle comprising:

a metal nozzle element having at least one feed nozzle and at least one cleaning nozzle arranged therein;

a camera adapter at least partially inserted into an internal space of the metal nozzle element;

a camera module connected via the camera adapter to an electrical conductor carrying at least one of an electrical voltage and a data signal, the electrical conductor arranged in a connection area of a high-pressure tube to the nozzle; and the metal extension sleeve according to claim 10.

* * * * *